Feb. 6, 1962  F. P. STROTHER  3,019,972
APPARATUS FOR COUNTING NEPS
Filed Nov. 30, 1954
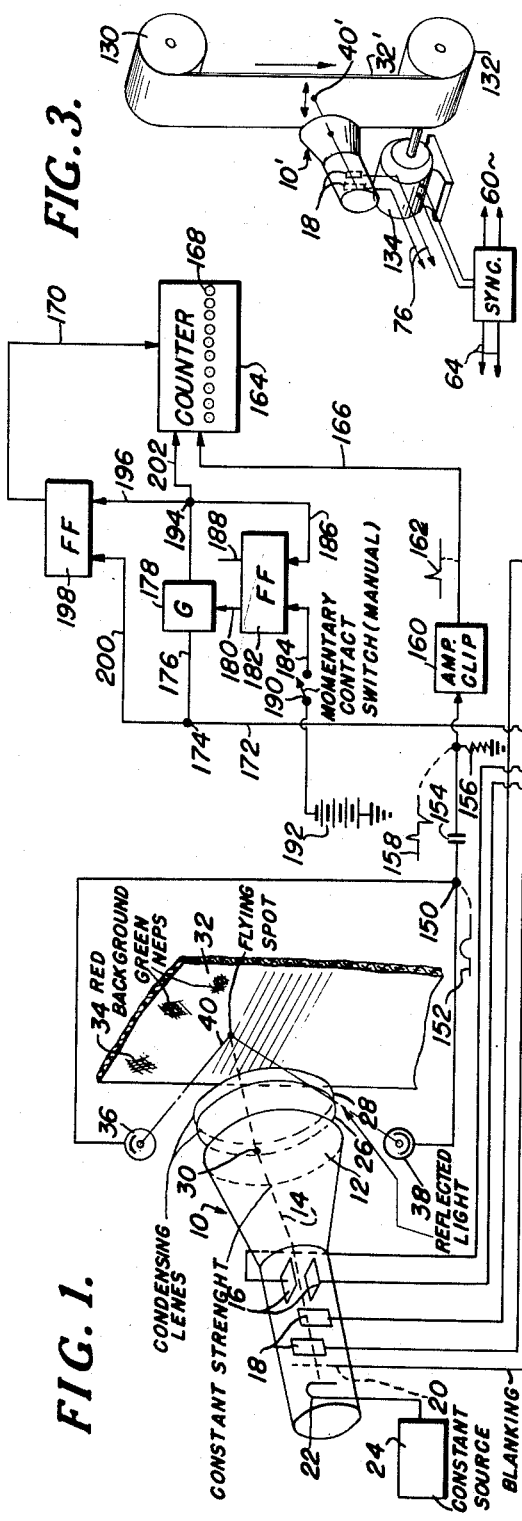
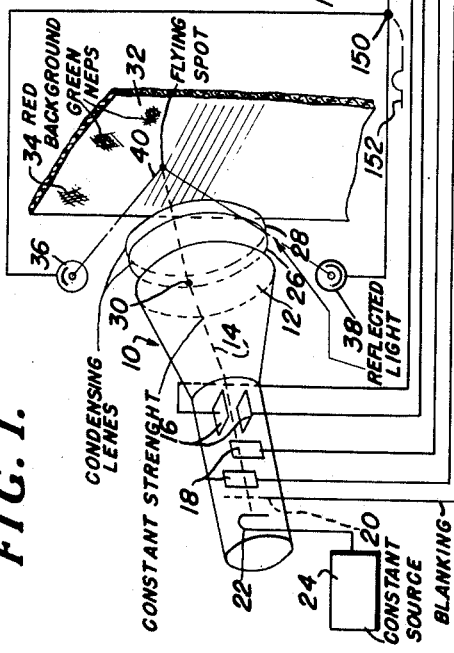
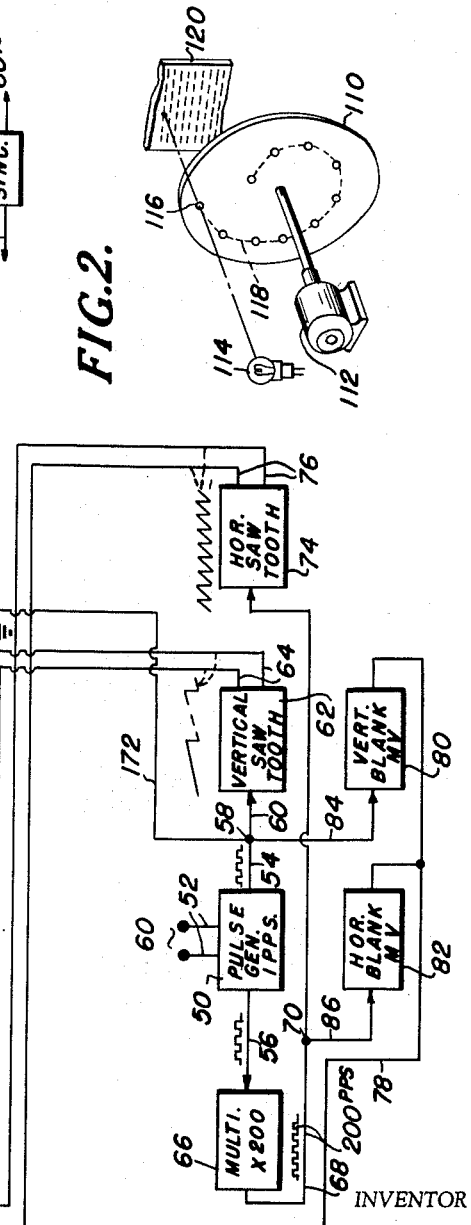
INVENTOR
*Fred P. Strother*
BY *Cushman, Darby & Cushman*
ATTORNEYS

United States Patent Office

3,019,972
Patented Feb. 6, 1962

3,019,972
APPARATUS FOR COUNTING NEPS
Fred P. Strother, Shawmut, Ala., assignor, by mesne assignments, to West Point Manufacturing Company, West Point, Ga., a corporation of Georgia
Filed Nov. 30, 1954, Ser. No. 471,973
2 Claims. (Cl. 235—92)

This invention relates generally to methods and apparatus for determining the number of imperfect areas in cloth material, and in particular to the counting of the effective number of neps or imperfections in a predetermined field of cloth when the neps have a light absorption characteristic different from that for the remainder of the cloth.

Although the term "light" is used in this description and the appended claims, it is not intended by the use thereof to limit the invention to visible light rays. Any ray of energy whether above, below or within the white light spectrum is included in the term light as long as the amount of energy of the ray may be changed and detected in accordance with the invention as described herein. Accordingly, the term "illumination" as used herein refers not only to the visible spectrum but to the detectable result of any of the rays of energy referred to above.

The invention encompasses a system including means for scanning with a beam of light a predetermined field of cloth in which the neps, if any therein, change the amount of illumination because of their light absorbing characteristics in comparison to the light absorbing characteristics of the surrounding cloth material. Means are provided to detect the changes in illumination and thereby to indicate the number of neps within the predetermined field of cloth. The detection means may be responsive to the light reflected from the cloth or to the light transmitted through the cloth, the neps in either case changing the intensity of the illumination received by the detection means to a different degree than the background or remainder of the cloth.

One object of the present invention is to provide apparatus and methods for obtaining the effective number of neps occurring in a piece of cloth material.

Another object of the invention is to provide apparatus and methods for scanning a given area of cloth with a beam of light and counting the changes in illumination therefrom in synchronism with the scanning means.

Another object of the invention is to provide apparatus and methods for determining the number of spots of one color in a differently colored area of cloth in relation to the size of the area.

Still other objects of this invention will become obvious to those skilled in the art by reference to the following description of the exemplary embodiments of the apparatus and the appended claims. The various features of the exemplary embodiments may be best understood with reference to the accompanying drawings wherein:

FIGURE 1 is a diagramamtic view of one embodiment of the apparatus employing the invention;

FIGURE 2 represents an alternative embodiment of the invention for producing scansion, and FIGURE 3 represents another alternative embodiment of the invention for producing scansion.

Before referring to the drawings and the operation of the exemplary apparatus illustrated therein, the obtaining of different light absorbing characteristics for the neps in cloth will be described.

One method of accomplishing a different light absorbing characteristic for a piece of cloth is to change the color thereof as is well understood in the art. Since it is desired to show a difference in the amount of illumination absorbed by the neps or immature fibers in the cloth, it becomes necessary (for this particular method) to cause the neps to appear in one color and the remainder of the cloth to be in another color. It has been found that immature cotton fibers (neps) do not dye normally and from this knowledge there has been developed a differential dyeing method for visually identifying thin-walled or immature cotton fibers. Such a technique of direct dyeing with a particular combination of two dyes of contrasting color and of different dyeing properties is fully explained in the article "New Dye Technique Shows 'Maturity' of Cotton" appearing at page 105 et seq. of Textile World, volume 97, July 1947.

A less time consuming differential dyeing method has since been discovered and consists of placing the cloth in a boiling dye bath made up of water (to 40 times the weight of the cloth) containing 1.2% Diphenyl Fast Red 5 BL Supra I (Geigy) and 2.8% chlorantine Fast Green BLL (Ciba), all calculated on the weight of the cloth. After dyeing for one minute, the cloth is removed and 5% of its original weight of sodium chloride is stirred into the dye bath. The cloth is re-entered for fifteen minutes then removed to a cold rinse. The cloth is rinsed twice in cold water (large amount), one minute in boiling water, and then twice in a large volume of cold water. Following that the cloth is squeezed as dry as possible and allowed to dry in open air or with moderate heat. Mature cotton in its natural state will be colored red and the immature cotton (neps) will be a shade of green. This method of dyeing is considered superior to the longer method explained in the above-mentioned article since it is not only shorter but shows up many more neps.

This invention is not to be considered limited to any particular method of providing the neps with a peculiar light absorbing (reflecting or transmitting) characteristic in comparison to the material surrounding them, since the above methods were mentioned only as possibilities.

Assuming the cloth to be treated in accordance with one of the above processes for leaving the background predominantly red in color and the so-called neps green, an electronic system as follows is employed for counting the effective number of occurrences of neps:

Reference character 10 designates generally a cathode ray tube having a fluorescent face 12 of a type to give off green light when activated by electron beam 14 of constant strength. Tube 10 is provided with the usual vertical deflecting plates 16, horizontal deflecting plates 18, blanking control grid 20 and electron emitting filament 22. Instead of deflecting plates 16 and 18, the tube could be provided with the well known deflecting coils (not shown). Filament 22 is connected to a source of constant power 24. Associated with the tube 10 are focusing means or condensing lenses 26 and 28 for assembling light rays emitted from a spot 30 onto a section of cloth 32 to be analyzed for neps 34 occurring therein. As previously stated, the cloth 32 is generally of a given color, for example, red with the neps in a different color. Broadly stated, the neps have a different light absorbing (reflecting, or transmitting) characteristic with respect to the remainder of the material.

Light detecting means such as photoelectric cell 36 by itself or in conjunction with photoelectric cell 38 may be provided and so positioned as to pick up light reflected from the neps 34 or the background 32, as may be the case.

If the neps are green against a red background, and the spot 30 is green light, only green light will reach the photocells 36 and 38. As an alternative, if the spot 30 is white light and the neps green against a red background, green filters (not shown) may be placed in front of the photocells to render same responsive only to green light. All other combinations of light filtering means may be employed but none need be used. Where the photocells are more responsive to light reflected from the neps than to the light reflected from the background, there will be an increase in conductivity in the photocells whenever a nep is encountered. However, if the photocells are arranged to be responsive mainly to the light reflected from the background rather than the light reflected from the neps, then there will be a decrease in conductivity. Either situation may be conveniently employed in the circuits to be described hereinbelow to render an activation of counting means. It should be understood that this invention is not limited to the light detecting means receiving reflecting light since photocells may be operated as well by the light transmitted through the background and/or neps.

The tube 10 is so driven as to cause the spot 30 to be focused onto the material 32 to become a so-called flying spot or scanning beam of light 40. Spot 40 scans the material in any usual fashion, as for example, common television scanning.

Scansion may be achieved by use of electronic circuitry as follows: A basic source of pulses is provided at pulse generator 50; for example, circuit 50 may produce 1 pulse per second, standardized by connection to 60 cycle alternating current mains 52. Pulses at the rate of 1 per second (to continue with a specific example, without limitation thereto) are available on output lines 54 and 56. Line 54 is connected to junction 58 and from this point on line 60 to a vertical saw-tooth wave generator 62. The output of generator 62 appears on lines 64 which are connected to the previously mentioned field or vertical deflecting plates 16 of the cathode ray tube 10.

The pulses on line 56 from pulse generator 50 are multiplied as desired in multiplication circuit 66. For example, the multiplication may be by 200, giving 200 pulses per second on output line 68. These pulses are conveyed to a junction 70 and from there over line 72 to a horizontal saw-tooth wave generator 74. The output of generator 74 is on line 76 connected to the previously mentioned horizontal deflecting plates 18 of the cathode ray tube 10.

The tube 10 is blanked during both vertical and horizontal retrace intervals by connection of control grid 20 over line 78 to vertical blanking circuit 80 and horizontal blanking circuit 82. Circuits 80 and 82 may be any well known type of automatically resetting multivibrator circuits energized respectively by pulses over lines 84 and 86.

At this point it may be further mentioned that the flying spot 40 may be established by use of the well known flying spot light disc, having a plurality of apertures positioned spirally. That is, referring to FIGURE 2, a disc 110 is arranged to be rotated by motor 112 so that light from constant source 114 is projected through apertures 116 on a spiral line designated 118 so as to produce a complete scansion of a given area 120 in the interval occupied by one complete rotation of the disc. This type of flying spot scanning is well known in the art and no further description thereof is thought to be necessary.

Referring to FIGURE 3, it may also be mentioned that vertical deflection in a cathode ray tube, here designated generally 10', may be dispensed with by imparting relative motion between a projected flying spot 40' and the material 32' to be analyzed. That is, material 32' may be payed off roll 130 and taken up on roll 132, the latter roll being driven by a suitable motor 134. While this circuitry is obviously possible, for simplicity of explanation, the arrangement of FIGURE 3 may be employed by simply disconnecting lines 64 leading to vertical deflecting plates 16 of the arrangement shown in FIGURE 1. Motor 134 may then be operated in synchronism with the output of vertical generator 62.

It will be further understood that a flying light spot as generated by a device as shown in FIGURE 2 may be employed in the arrangement of FIGURE 3 to replace the cathode ray tube 10'.

The output signals of photocells 36 and 38 (FIG. 1) are utilized as follows according to the invention, taking as an example the system of FIGURE 1, wherein the material 32 may be considered to be stationary with respect to the cathode ray tube 10 and condensing or focusing lenses 26 and 28. The outputs of photocells 36 and 38 (incidental photocell circuits not shown) are joined at junction 150, whereat a typical voltage deviation may be as indicated by line 152 whenever the flying spot 40 crosses a nep. A differentiation circuit comprising capacitor 154 and resistor 156, as will be well understood by those skilled in the art, produces sharp peaks or spikes at the beginning and end of a waveform of the type shown by line 152. Typical spikes are shown by line 158. By changing the values of capacitor 154 and/or resistor 156, the response of the circuit to signals of varying degrees of abruptness at junction 150 may be selected. Thus the circuit may be caused to pass over false neps or slight imperfections in the material 32 unless they obtain a predetermined degree of distinctiveness or abruptness from the background.

From the differentiation circuit of capacitor 154-resistor 156, the signals are applied to an amplifying and clipping circuit 160. One of the spikes, that is, either the positive or negative spike, is removed so that only one pulse remains for every nep or other imperfection encountered as the flying spot moves along a line. The amplification in circuit 160 will be sufficient to cause the remaining spike 162 to be employed to actuate an electronic counter 164. Signals according to line 162 are conducted to the counter 164 over line 166. The counter 164 may be any of a number of well known electronic counter types, having a panel of indicating lamps 168, for example, for indicating the total count in binary code or otherwise.

It will be apparent that the total effective nep count should have some relation to the number of times a given area of the material 32 has been scanned. A total could be obtained after the scanning of one horizontal line, after the scanning of one complete vertical field, or at any other interval. Assuming, for example, that a total count should be registered upon the scansion of a complete vertical field, the following circuit is provided: The counter 164 is so arranged that pulses on line 166 will actuate it only while an energizing potential is available on a line 170. Vertical pulses available at junction 58 are applied over line 172 to a junction 174 and then over line 176 to a gate circuit 178. The second input to gate 178 is over line 180 which is one output line of a so-called flip-flop circuit 182. This is a circuit well known to those skilled in the art, operating on the principle of so-called Eccles-Jordan circuits. An input to the flip-flop circuit on one of two input lines 184 will cause a given level of potential to appear on line 180, for example, a relatively high potential. A signal subsequently applied to line 186 constituting a second input to flip-flop circuit 182 will cause the potential on line 180 to drop to a lower value. An unused output line 188 will carry a potential opposite to that obtaining on line 180 at any instant of time. Circuit 182 may conveniently be arranged to respond either to positive pulses on the input lines, or to negative pulses. It will be assumed in the present example that negative pulses are applied.

Continuing in the assumption that a total effective nep count is to be obtained following scansion of one complete vertical field, a momentary contact type switch 190 is provided, for momentarily applying a negative pulse to line 184. The source of the pulse may be battery 192. Whenever the negative pulse is applied to line 184 by manual operation of switch 190, the relatively high potential appears on line 180 and gate 178 is opened. The next thereafter appearing vertical pulse on line 172 passes through gate 178 and appears at junction 194. This pulse at junction 194 is connected to line 186 to shift the flip-flop 182 to close gate 178 to prevent any further ones of the vertical pulses from passing gate 178. The same pulse which appeared at junction 194 is also connected over line 196 to shift a flip-flop circuit 198 (similar to circuit 182) so that a relatively high potential appears on its output line which is the previously mentioned counter energization line 170. Once the counter is energized over line 170, it will continue to be energized by the pulses on line 166, and a count will be indicated by the lamp panel 168. When the scansion of a complete vertical field is finished, another vertical pulse will appear at junction 174. Gate 178 has previously been closed, as explained, but junction 174 is connected to the second input of flip-flop 198 over line 200. A pulse on line 200 will shift the flip-flop 198 so that a lower potential is applied to line 170 and the counter will not thereafter be responsive to pulses on line 166.

The counter 164 may be conveniently reset by connection of line 202 between junction 194 and the counter. Thus the pulse passing gate 178 which energized the counter also resets it so that the count starts from zero.

From the foregoing it will be apparent that upon actuation of switch 190 a count is indicated representative of a single scansion of a complete vertical field. It will be apparent also that if a count for a single horizontal scansion line is desired, the line 172 may be disconnected from the vertical pulses and connected with the source of horizontal pulses, as at junction 70. It will be further apparent that provision of a frequency dividing circuit (not shown) in line 172 will permit the count to be representative of more than one field scansion. For example, if the pulse rate on line 172 is divided by two, the total count will designate two complete scansions. This may be of some advantage, in obtaining an average reading, by dividing the total count in the counter by the number of field scanning operations.

When using the arrangement of FIGURE 3 for continuously scanning a moving sweep of material, the count can be conveniently correlated to the speed of motion of the material 32'.

In the above description, a flying spot type of scansion has been described in all cases. However, it will be apparent that the system may be inverted and a television camera of the storage type, for example, an image orthicon camera of the storage type, for example, an image orthicon tube, may be employed with a color filter, for example, green, placed between the tube and the material and with either green or white light reflected thereon. If only green light is employed no filter will be necessary. The scansion in the tube may be controlled as described in connection with FIGURE 1 and the output of the image orthicon tube applied to junction 150. Thereafter the operation may be identical. The signal from this camera tube would be almost exactly the same as that secured from the photoelectric cells 36, 38 of FIGURE 1. Utilizing a camera tube allows any of the usual and more economical means of obtaining a high lighting intensity on the object being measured and produces a better signal to noise ratio. In effect the television type camera tube produces a scansion of light over the field of cloth the same as the cathode ray tube (although not technically so) and reference in the claims to light scansion means is intended to include camera tube light scansion.

Still another method of producing the desired scan is to make use of rotating mirrors, one embodiment of this principle being a rotating mirror on the end of a motor shaft, said motor being so mounted that a gear train and/or feed screw mechanism or ratchet arrangement would cause a tilt in the motor and mirror assembly, sweeping the area to be scanned.

Another scanning system is to employ a stable source of pulses for triggering a sweep generator and amplifier to produce the horizontal scan at a rate of, say, 200 cycles per second in a manner similar to that shown in FIGURE 1. The pulses generated by the fly-back of the sweep would be fed through an isolating amplifier and diodes to charge a capacitor. The charge on this capacitor would then be proportional to the number of pulses or lines and could be used to drive the vertical sweep through an amplifier. The vertical sweep voltage would then become a saw tooth wave composed of a number of stairsteps or square waves added on to each other, causing the beam to scan horizontally in a straight line, and drop down the correct amount for the next line during the fly-back time when it is blanked out. If the pulses caused by the fly-back of the horizontal sweep are further fed through a series of dividers, any number of lines, say 200, can be added and the pulse coming out of the last divider (which occurs at the end of 200 horizontal sweeps or pulses) can be used to determine quite accurately the vertical sweep each time, as well as the number of lines. As the application of a device of this type would require scanning the field only once and then taking a reading of the counters, it is apparent that there would always be exactly the same number of horizontal lines present in one vertical sweep. Of course, this or any other system of sweep could be applied to either the cathode ray tube or the camera tube as is desired. Operation of such a device might consist of actuating a switch which would cause the sweep to operate and scan the desired field one time with a correct number of lines and then display the count until such a time as the counter is reset.

Modifications of this invention not described herein may become apparent to those skilled in the art, but it is intended that the matter contained in the foregoing description and the accompanying drawings be interpreted as illustrative and not limitative, the scope of invention being defined in the appended claims.

What is claimed is:

1. In apparatus for determining the effective number of neps or the like in a predetermined field of cloth having a background contrasting with said neps in light adsorption characteristics, means including a pulse source for producing an effective light scansion in traces to cover said predetermined field, means responsive to illumination from said predetermined field of cloth for producing a pulse for each nep in each of said scansion traces, counting means responsive to the said nep produced pulses for counting same when the counting means is otherwise enabled, and gating means coupled between the counting means and said pulse source and responsive to pulses derived from the latter for otherwise enabling the counting means in synchronization with said scansion continuously during only and all of a predetermined number of scansion traces required to cover said predetermined field to cause the counting means to count all the said nep produced pulses resulting during said predetermined number of scansion traces only said gating means including a gate and a flip-flop, the output of the gate being coupled to the flip-flop at one input the corresponding output of which is coupled to an enabling input of the counting means, the other input of said flip-flop and the input to said gate being coupled in common to said pulse source for receiving pulses derived therefrom, the arrangement being such that changes in illumination caused by the contrast of said neps with background during the scansion of said predetermined field of cloth is indicated by said counting means.

2. In apparatus for determining the effective number of neps or the like in a predetermined field of cloth having a background contrasting with said neps in light absorption characteristics, means for producing an effective light scansion in traces to cover said predetermined field, said scansion means including deflection means operative when energized to cause scansion in at least one predetermined direction, pulse producing means connected to said deflection means for energization thereof and control of the scansion in at least said one direction, means responsive to varying illumination from said field of cloth to produce correspondingly varying output signals, and means including gated counting means coupled to the outputs of both the illumination responsive means and the pulse producing means for causing the counting means to be gated and thereby continuously enabled in synchronization with said scansion by the output of said pulse producing means during a predetermined interval including only the number of traces required to cover said field so that the counting means will provide an indication of the number of variations in said output signal during said predetermined interval, the said means including gated counting means comprising a counter having a pulse count input coupled to receive said output signals, an enabling input, and a reset input, a gate, a flip-flop, means coupling the output of the gate to said reset input of the counter and to the flip-flop at a first input the corresponding output of which is coupled to said enabling input, means coupling a given output of the said pulse producing means to the second input of said flip-flop and to one input of said gate for passing pulses from said pulse producing means when enabled, and means coupled to a second input of said gate and to the output thereof for selectively enabling the gate to pass but one pulse from the said given output of the pulse producing means.

References Cited in the file of this patent
UNITED STATES PATENTS

| | | |
|---|---|---|
| 2,494,441 | Hillier | Jan. 10, 1950 |
| 2,584,052 | Sandorff et al. | Jan. 29, 1952 |
| 2,615,992 | Flory et al. | Oct. 28, 1952 |
| 2,661,902 | Wolff | Dec. 8, 1953 |
| 2,731,200 | Kolesch | Jan. 17, 1956 |
| 2,756,627 | Boycks | July 31, 1956 |
| 2,789,765 | Gillings | Apr. 23, 1957 |
| 2,791,377 | Dell et al. | May 7, 1957 |
| 2,791,695 | Bareford et al. | May 7, 1957 |
| 2,791,697 | Dell | May 7, 1957 |
| 2,807,414 | Howard | Sept. 24, 1957 |
| 2,807,728 | Kilburn et al. | Sept. 24, 1957 |
| 2,907,519 | Covely | Oct. 6, 1959 |